United States Patent Office 3,163,000
Patented Dec. 29, 1964

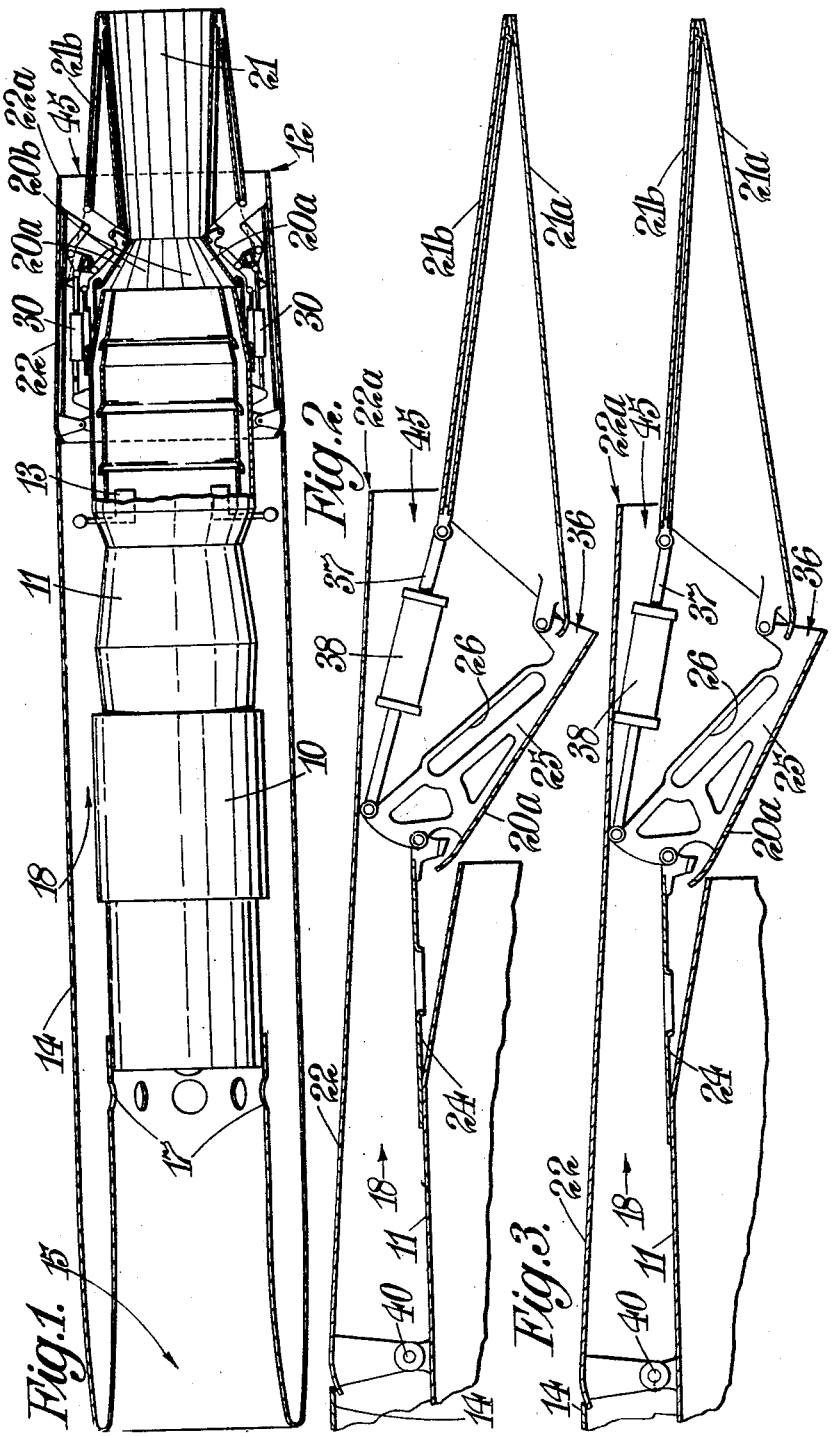

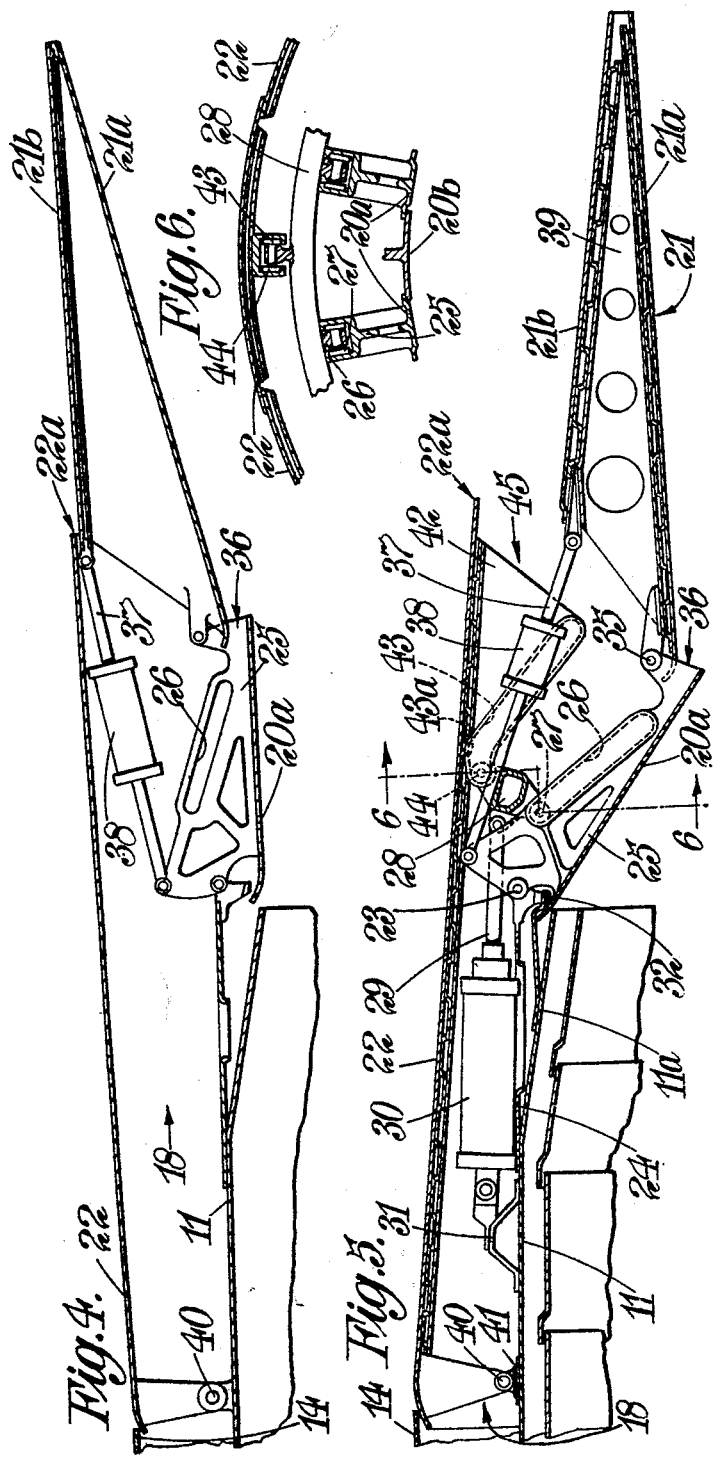

3,163,000
JET PROPULSION NOZZLE ARRANGEMENTS
Frederick William Walton Morley, Castle Donington, Leicestershire, Gordon Cyril May, Allestree Park, Derby, and Norman Arthur Kerridge, Alvaston, Derby, England, assignors to Rolls-Royce Limited, Derby, England, a British company
Filed Nov. 24, 1961, Ser. No. 154,769
Claims priority, application Great Britain, Nov. 28, 1960, 40,867/60
10 Claims. (Cl. 60—35.6)

This invention comprises improvements in or relating to jet propulsion nozzle arrangements for aircraft.

According to the present invention, an aircraft jet propulsion nozzle arrangement comprises a plurality of upstream flaps which are pivotally supported adjacent their upstream ends and together form a convergent nozzle section of variable convergence, a corresponding plurality of downstream flaps which are pivotally mounted by their upstream ends on the downstream ends of the upstream flaps, the downstream flaps having inner walls which together define a divergent nozzle section downstream of the convergent nozzle section, the downstream flaps further having outer walls, fairing structure spaced outwardly from the upstream flaps and having a trailing edge substantially level axially of the nozzle with the upstream ends of the outer walls of the downstream flaps, and means to effect swinging of the flaps between a first position in which the area of a throat defined by the downstream ends of the upstream flaps is a minimum and in which the upstream ends of the outer walls of the downstream flaps are spaced inwards from the trailing edge of the fairing structure, and a second position in which the throat area is greater and the outer walls of the downstream flaps constitute downstream continuations of the fairing structure.

This arrangement enables the downstream extent of the fairing structure and the size of the downstream flaps to be kept low, and also the aerodynamic drag, which would otherwise be incurred when the flaps are adjusted away from the second position as a result of the discontinuity between the fairing structure and the outer walls of the downstream flaps, can be minimised by supplying air to flow from the space between the nozzle flaps and the fairing structure to atmosphere through the gap between the trailing edge of the fairing structure and the upstream ends of the downstream flaps.

According to a feature of this invention, the trailing portion of the fairing structure may also be formed by flaps which are coupled to move with the nozzle flaps such that, in the first position of the nozzle flaps, the fairing flaps converge in the direction towards the trailing edges thereof and that as the nozzle flaps move towards their second position, the convergence of the fairing flaps is reduced. In the second position of the nozzle flaps, the fairing flaps may form a linear continuation of fixed fairing structure upstream of these flaps.

According to yet another feature of this invention, the nozzle flaps may be pivoted together so that the upstream ends of the downstream flaps are spaced radially outwards from the downstream edges of the upstream flaps thereby to permit a flow of cooling air from the space between the nozzle and fairing along the inner surface of the inner walls of the downstream flaps. The arrangement is preferably such that this flow of air is maintained in all settings of the nozzle flaps.

The nozzle arrangement of this invention is especially suitable for use with high speed aircraft, for instance aircraft designed for flight at supersonic speeds. It is usual to power such aircraft with gas turbine engines provided with reheat equipment and to operate the reheat equipment under substantially all flight conditions, the degree of reheat being varied with flight speed. When the nozzle arrangement is employed in such aircraft, the nozzle flaps are preferably adjusted towards their second position as the degree of reheat is increased, and are preferably arranged to reach their second position at the degree of reheat corresponding to maximum design Mach No. of the aircraft.

Such supersonic aircraft may also be provided with an air intake which leads to the engines and from which air is spilled.

According to a preferred feature of this invention, spilled air from such an air intake is conveyed rearwardly to the space between the nozzle and the fairing structure and is allowed to flow to atmosphere through the space between the trailing edge of the fairing structure and the downstream flaps thereby to reduce aerodynamic drag as above described. The spilled air may also be used as a source of cooling air.

One arrangement embodying the above and other features of this invention will now be described with reference to the accompanying drawings in which:

FIGURE 1 is a diagrammatic illustration of a power plant installation of a supersonic aircraft, FIGURES 2, 3 and 4 show diagrammatically various settings of the propulsion nozzle arrangement seen in FIGURE 1, FIGURE 5 is a detailed view drawn to a larger scale of the nozzle arrangement seen in FIGURE 1, and FIGURE 6 is a section on the line 6—6 of FIGURE 5.

The power plant installation shown in FIGURE 1 comprises a gas turbine engine 10 fitted with a jet pipe 11 through which combustion gases are conveyed to a convergent/divergent adjustable jet propulsion nozzle arrangement 12. Reheat combustion equipment 13 is fitted in the jet pipe 11 so that engine exhaust gases can be reheated prior to leaving the power plant.

The engine 10 is enclosed in a fairing structure 14 having an air intake 15 at its forward end to lead air to the engine. The walls of the intake include apertures 17 which permit air to be spilled from the intake 15 into a passage 18 formed around the engine 10. The passage 18 leads into the nozzle arrangement 12.

The nozzle arrangement 12 (FIGURES 5 and 6) comprises upstream nozzle flaps 20a, 20b, downstream nozzle flaps 21 and fairing flaps 22.

The upstream nozzle flaps 20a, 20b of which there is a large number, together form a circular section convergent nozzle section of variable convergency and as will be seen from FIGURE 6 the flaps 20a, 20b overlap at their lateral edges to provide a continuous wall to the gas passage in all positions of adjustment. Alternate upstream flaps 20a are pivotally connected by pivots 23 to the downstream end of a sleeve 24 secured to and surrounding a fixed convergent portion 11a of the jet pipe 11. The pivots 23 engage bores in central ribs 25 on the external surface of the flaps 20a, and these ribs 25 are also formed with cam tracks 26 which are engaged by rollers 27 carried by a ring 28 encircling the flaps 20. The ring 28 is pivoted to the ends of a series of piston rods 29 of rams 30 which are pivoted to brackets 31 mounted on the exterior of the jet pipe 11 and it is arranged that as the rams 30 expand, the ring 28 moves to the right (as viewed in FIGURE 5) so causing the flaps 20a to swing outwardly reducing the convergence of the convergent nozzle section. The remaining flaps 20b are connected to move with the flaps 20a in any convenient way.

The sleeve 24 carries an annular seal 32 which co-operates with the external surfaces of the flaps 20a, 20b.

The downstream flaps 21, the number of which corresponds to the number of the flaps 20a, together form a divergent section of the nozzle arrangement, the divergence being variable. A sealing flap is positioned between each flap 21 in alignment with each flap 20b, the sealing flaps being supported from adjacent flaps 21. Each flap 21 is connected at its upstream end by a pivot 35 to the downstream end of the aligned flap 20a, the pivots 35 engaging the ribs 25 at positions offset from the flaps 20a so that the upstream ends of the flaps 21 and the sealing flaps are radially spaced outwards from the flaps 20a, 20b to leave an air flow gap 36 through which cooling air from passage 18 can flow to pass along the inner surfaces of the flaps 21 and their associated sealing flaps to cool them.

The flaps 21 which are pivoted to flaps 20a, are also connected by extensible links 37 to a selected point at the forward ends of the ribs 25 of the flaps 20a, so that by extending or contracting the links 37 the angular relationship of the flaps 21, 20a can be varied. The link 37 is shown as including a ram 38 for varying the link length. The sealing flaps associated with the flaps 21 are coupled with the flaps 21 to follow their movement.

Each flap 21 has an inner wall 21a and an outer wall 21b which are interconnected by a rib 39 and which are convergent in the direction of gas flow through the nozzle. The inner walls 21a together define the divergent portion of the exhaust gas passage. The purpose of the outer walls 21b will appear below.

Each fairing flap 22 is mounted by a pivot 40 on a bracket 41 on the outside of the jet pipe 11 at a position well upstream from the flaps 20a, 20b, and has its trailing edge 22a approximately level with the upstream ends of the downstream nozzle flaps 21. Each flap 22 carries a bracket 42 formed with cam tracks 43 which are engaged by rollers 44 carried by the ring 28. The cam tracks 43 have a dwell portion 43a at one end.

In operation during ground running, the flaps 20, 21, 22 are in the position shown in FIGURE 2 in which the flaps 20a, 20b give maximum convergence and the links 37, 38 are contracted. In this position of the flaps, the rollers 27 are at the left hand ends of the tracks 26 and the rollers 44 are in the dwell portions 43a of the tracks 43. Under ground running conditions, there is no spillage of air through the apertures 17, but the ejector effect of the exhaust gases flowing through the nozzle causes a flow of cooling air to be drawn in through the gap 45 to flow around the upstream ends of the flaps 21 and to be discharged through the gap 36 along the inner surfaces of the walls 21a.

In flight operation, as the degree of reheat and the flight Mach No. are increased the ring 28 is moved to the right and the link 37 is lengthened so moving the flaps 20, 21, 22 from the position of FIGURE 2 through that of FIGURE 3, to the position of FIGURE 4 which corresponds to maximum reheat and design Mach No. During this movement, the gap 45 between the trailing edges 22a of the fairing flaps 22 and the upstream ends of the downstream flaps 21 is gradually decreased, and the spillage air flowing in passage 18 flows partly through the gap 36 to cool the inner walls 21a of the flaps 21 and partly to atmosphere through the gap 45. The flow of air through the gap 45 reduces the aerodynamic drag of the nozzle arrangement from the value, which it would have if no such air flow were provided, due to the offsetting of the walls 21b from the flaps 22.

At design flight Mach No., there is only a small amount of air-flow through the apertures 17 and when this condition is reached the gap 45 is closed, by the walls 21b of the flaps 21 and the sealing flaps mating up with the trailing edges of the flaps 22 to form a smooth flow surface from the fixed fairing structure 14 over flaps 22, 21 to the downstream end of the nozzle arrangement. The gap 36 however remains constant and under these conditions air may be tapped off from the engine compressor to flow through passage 18 and gap 36 over the walls 21a.

By providing a film of air over the inner walls 21a any shock wave formed in the nozzle is unable to contact the inner walls 21a and therefore the flaps 21 and their associated sealing flaps are subjected to less vibration than they would be if a film of cool air was not present.

The nozzle arrangement 12 may be used as an air brake during landing of the aircraft. Under such conditions the flaps 21 and their associated sealing flaps may be moved from the position shown in FIGURE 2 to a position in which their downstream end projects into the airstream flowing over the surface of the flaps 22. This may be achieved by shortening the link 37 by contracting of the ram 38, so pivoting the flaps 21 about the pivots 35. The throat area of the nozzle is unaffected by such adjustment.

We claim:

1. A jet propulsion nozzle arrangement for aircraft comprising a plurality of upstream flaps which are pivotally supported adjacent their upstream ends and together form a convergent nozzle section of variable convergence, a corresponding plurality of downstream flaps which are pivotally mounted by their upstream ends on the downstream ends of the upstream flaps and define therewith a gap, the downstream flaps having inner walls which together define a divergent nozzle section downstream of the convergent nozzle section, the downstream flaps further having outer walls, fairing structure spaced outwardly from the upstream flaps and having a trailing edge disposed adjacent the upstream ends of the outer walls of the downstream flaps, means to effect swinging of the flaps between a first position in which the area of a throat defined by the downstream ends of the upstream flaps is a minimum and in which the upstream ends of the outer walls of the downstream flaps are spaced inwards from the trailing edge of the fairing structure to define a space therewith, and a second position in which the throat area is greater and the outer walls of the downstream flaps constitute downstream continuations of the fairing structure, and means to supply air to said space and said gap, the air supplied to said space flowing along said outer walls to atmosphere and the air supplied to said gap flowing along said inner walls to cool them.

2. A jet propulsion nozzle arrangement according to claim 1 wherein the nozzle flaps are pivoted together so that the upstream ends of the downstream flaps are spaced radially outwards from the downstream edges of the upstream flaps to define said gap in all settings of the nozzle flaps.

3. A jet propulsion nozzle arrangement according to claim 1, wherein the trailing portion of the fairing structure is formed by flaps which are coupled to move with the nozzle flaps such that, in the first position of the nozzle flaps, the fairing flaps converge in the direction towards the trailing edges thereof and that as the nozzle flaps move towards their second position, the convergence of the fairing flaps is reduced.

4. A jet propulsion nozzle arrangement according to claim 3 wherein in the second position of the nozzle flaps, the fairing flaps form a linear continuation of fixed fairing structure upstream of these flaps.

5. A jet propulsion nozzle arrangement according to claim 1, wherein the means effecting swinging of the flaps comprises a ring encircling the upstream flaps, rams connected to displace the ring lengthwise of the nozzle and cam and roller connections between ring and the upstream flaps, and adjustable length links connecting the downstream flaps to the upstream flaps so that on alteration of the length of the links the angle between the upstream and downstream flap is varied.

6. A jet propulsion nozzle arrangement according to claim 5 wherein the ring has cam and roller connections with the fairing flaps.

7. A jet propulsion nozzle arrangement according to claim 6 wherein there is a large number of upstream flaps and alternate upstream flaps have such cam and roller connections to the ring, the remaining upstream flaps being supported from said alternate upstream flaps and overlapping them at their edges, and wherein alternate downstream flaps are pivoted to the alternate upstream flaps and have such link connection with them, the remaining downstream flaps being sealing flaps and being supported by the said alternate downstream flaps.

8. A high speed aircraft including a jet propulsion power plant having reheat equipment and a jet propulsion nozzle as claimed in claim 1, wherein the nozzle flaps are adjusted towards their second position as the degree of reheat is increased.

9. A high speed aircraft according to claim 8, wherein the nozzle flaps are arranged to reach their second position at the degree of reheat corresponding to maximum design Mach No. of the aircraft.

10. A high speed aircraft according to claim 8, comprising also an air intake which leads to the engines and from which air is spilled, wherein spilled air from such an air intake is conveyed rearwardly to the space between the nozzle and the fairing structure and is allowed to flow to atmosphere through the space between the trailing edge of the fairing structure and the downstream flaps thereby to reduce aerodynamic drag.

References Cited by the Examiner
UNITED STATES PATENTS

| | | | |
|---|---|---|---|
| 2,995,010 | 8/61 | Arscott | 60—35.6 |
| 2,999,354 | 9/61 | Gallo et al. | 60—35.6 |
| 3,044,258 | 7/62 | Carlton et al. | 60—35.6 |
| 3,049,873 | 8/62 | Weeks | 60—35.6 |

SAMUEL LEVINE, *Primary Examiner.*